US012585483B2

(12) United States Patent
Lenihan et al.

(10) Patent No.: US 12,585,483 B2
(45) Date of Patent: Mar. 24, 2026

(54) MANAGING DEPLOYMENT AND MIGRATION OF VIRTUAL COMPUTING INSTANCES

(71) Applicant: Hewlett Packard Enterprise Development LP, Houston, TX (US)

(72) Inventors: John Lenihan, Galway (IE); Siva Subramaniam M., Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 629 days.

(21) Appl. No.: 17/809,298

(22) Filed: Jun. 28, 2022

(65) Prior Publication Data

US 2023/0281032 A1 Sep. 7, 2023

(30) Foreign Application Priority Data

Mar. 7, 2022 (IN) .............................. 202241012224

(51) Int. Cl.
*G06F 9/455* (2018.01)
*G06Q 50/04* (2012.01)

(52) U.S. Cl.
CPC ......... *G06F 9/45558* (2013.01); *G06Q 50/04* (2013.01); *G06F 2009/4557* (2013.01)

(58) Field of Classification Search
CPC ...... G06F 9/455; G06F 9/4856; G06F 9/5088; G06F 9/45558; G06F 2009/4557;
(Continued)

(56) References Cited

U.S. PATENT DOCUMENTS 9,953,280 B2 * 4/2018 Cooper ............... G06F 16/2453
10,768,946 B2 9/2020 Aly et al.
(Continued)

FOREIGN PATENT DOCUMENTS

WO 2021/116124 A1 6/2021

OTHER PUBLICATIONS

Francisco Gamboa Quintanilla, Olivier Cardin, Pierre Castagna, Service Orientation in Holonic and Multi-Agent Manufacturing and Robotics, 2014, Springer, pp. 177-193 (Year: 2014).*
(Continued)

*Primary Examiner* — Aimee Li
*Assistant Examiner* — Ivan Alexander Castaneda
(74) *Attorney, Agent, or Firm* — Fletcher Yoder, P.C.

(57) ABSTRACT

Examples described herein relate to a centralized workflow management system (CWMS) and a method for managing the deployment and migration of virtual computing instances along a manufacturing line. The manufacturing line hosts a plurality of computing devices such as a first computing device and a second computing device to control operations performed by respective machines. To manufacture a first product, a first orchestration manager hosted in the CWMS deploys a first virtualized computing instance on the first computing device associated with a first stage of a first product manufacturing workflow. Further, upon the first product completing the first stage of the first product manufacturing workflow, the first orchestration manager migrates the first virtualized computing instance from the first computing device to a second computing device associated with a second stage of the first product manufacturing workflow.

20 Claims, 6 Drawing Sheets

(58) Field of Classification Search
CPC ........ G06F 2009/45557; G06F 9/4843; G06G 2009/45562; G06Q 50/04; G05B 19/0426; G05B 19/41835
See application file for complete search history.

(56) References Cited

U.S. PATENT DOCUMENTS

| | | | |
|---|---|---|---|
| 10,845,786 B2 * | 11/2020 | Chauvet | G06F 9/50 |
| 10,901,954 B2 | 1/2021 | Ma et al. | |
| 11,012,310 B2 | 5/2021 | Fandli et al. | |
| 2011/0022498 A1 * | 1/2011 | Ocke | G06Q 30/0641 |
| | | | 705/27.1 |
| 2016/0167173 A1 * | 6/2016 | Dubois | G02C 7/021 |
| | | | 425/162 |
| 2017/0323324 A1 * | 11/2017 | Banks | G06Q 30/0633 |
| 2020/0142712 A1 * | 5/2020 | Liu | G06F 9/455 |
| 2020/0153897 A1 | 5/2020 | Mestery et al. | |
| 2020/0241944 A1 * | 7/2020 | Derdak | G06F 9/547 |
| 2020/0250074 A1 | 8/2020 | Zhang et al. | |
| 2020/0278897 A1 | 9/2020 | Cormack et al. | |
| 2020/0310850 A1 * | 10/2020 | Liguori | G06F 9/54 |
| 2021/0014132 A1 * | 1/2021 | Smith | H04L 41/16 |
| 2021/0117307 A1 | 4/2021 | Macnamara et al. | |
| 2021/0157622 A1 | 5/2021 | Ananthapur Bache et al. | |
| 2021/0158236 A1 * | 5/2021 | Bikumala | G06N 20/10 |
| 2022/0129306 A1 * | 4/2022 | Wang | G06F 9/5038 |
| 2023/0367629 A1 * | 11/2023 | Götz | G06F 9/4856 |
| 2024/0019855 A1 * | 1/2024 | Knierim | G06F 21/51 |

OTHER PUBLICATIONS

Dániel Kozma, Pál Varga, Felix Larrinaga, IEEE Transactions on Automation Science and Engineering, Jul. 2, 2021, IEEE, vol. 18 , pp. 1354-1366 (Year: 2021).*

* cited by examiner

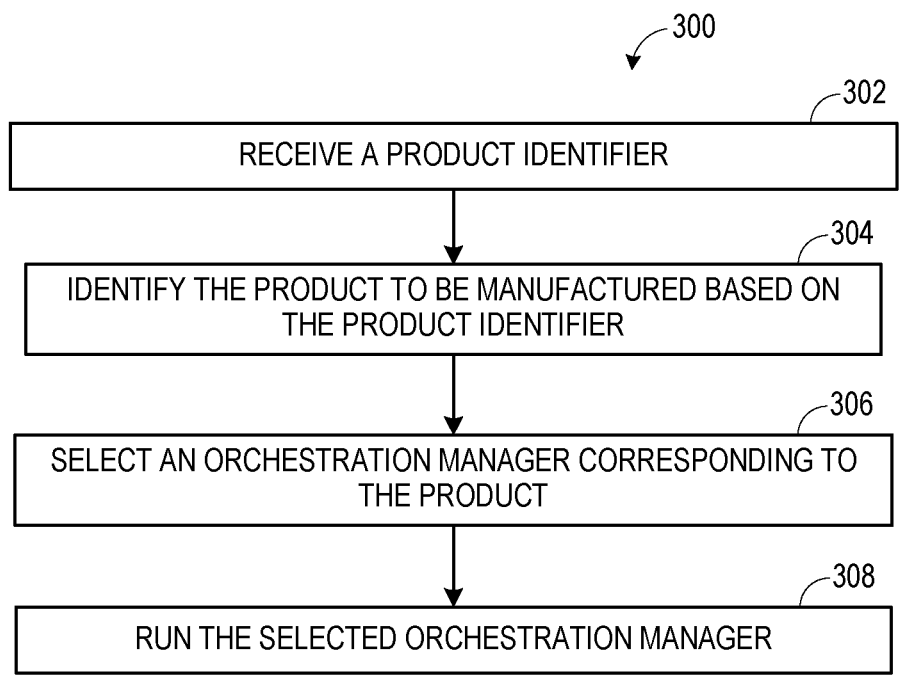

300

302
RECEIVE A PRODUCT IDENTIFIER

304
IDENTIFY THE PRODUCT TO BE MANUFACTURED BASED ON THE PRODUCT IDENTIFIER

306
SELECT AN ORCHESTRATION MANAGER CORRESPONDING TO THE PRODUCT

308
RUN THE SELECTED ORCHESTRATION MANAGER

*FIG. 3*

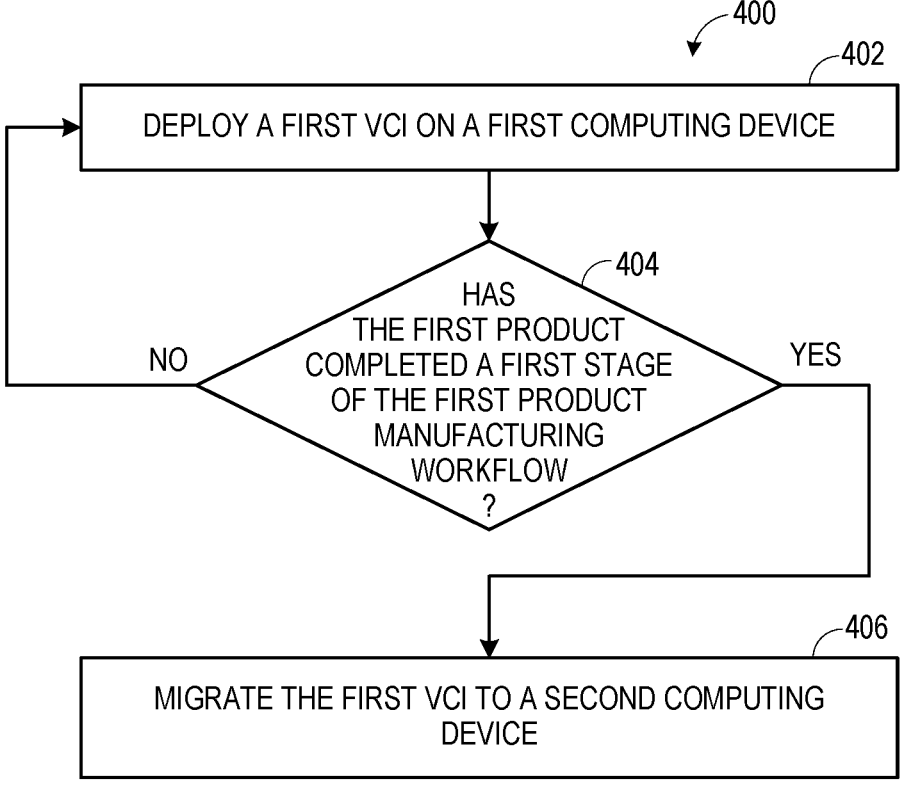

400

402
DEPLOY A FIRST VCI ON A FIRST COMPUTING DEVICE

404
HAS THE FIRST PRODUCT COMPLETED A FIRST STAGE OF THE FIRST PRODUCT MANUFACTURING WORKFLOW?

NO

YES

406
MIGRATE THE FIRST VCI TO A SECOND COMPUTING DEVICE

*FIG. 4*

MANAGING DEPLOYMENT AND MIGRATION OF VIRTUAL COMPUTING INSTANCES

BACKGROUND

Manufacturing processes are traditionally monitored and controlled using sensors and controllers distributed across the manufacturing equipment, each sensor and controller transacting information with a central computing system, often hosted in an on-site datacenter or even in a remote datacenter. Increasingly, the sensors and controllers are being augmented with in-situ computing capabilities and more robust networking capabilities, often referred to as Internet of Things (IoT). These IoT devices are usually limited in computational, memory, and storage capability when compared to traditional central computing systems.

In these distributed computing systems, monitoring and control workflows operate differently than the traditional central computing systems. Particular information or decisions may be contained in a certain device, and not inherently shared with the system as a whole. Many deployments of these distributed monitoring and control systems rely on proprietary solutions for monitoring, synchronizing, and controlling the overall workflow across distributed computing devices.

BRIEF DESCRIPTION OF THE DRAWINGS

Features, aspects, and advantages of the present specification will become better understood when the following detailed description is read with reference to the accompanying drawings in which like characters represent like parts throughout the drawings.

FIG. 3 depicts an example method for selecting an orchestration manager for the product to be manufactured on a manufacturing assembly line.

FIG. 4 depicts an example method for managing the deployment and migration of a virtual computing instance through computing devices hosted in a manufacturing line.

Figure 1:
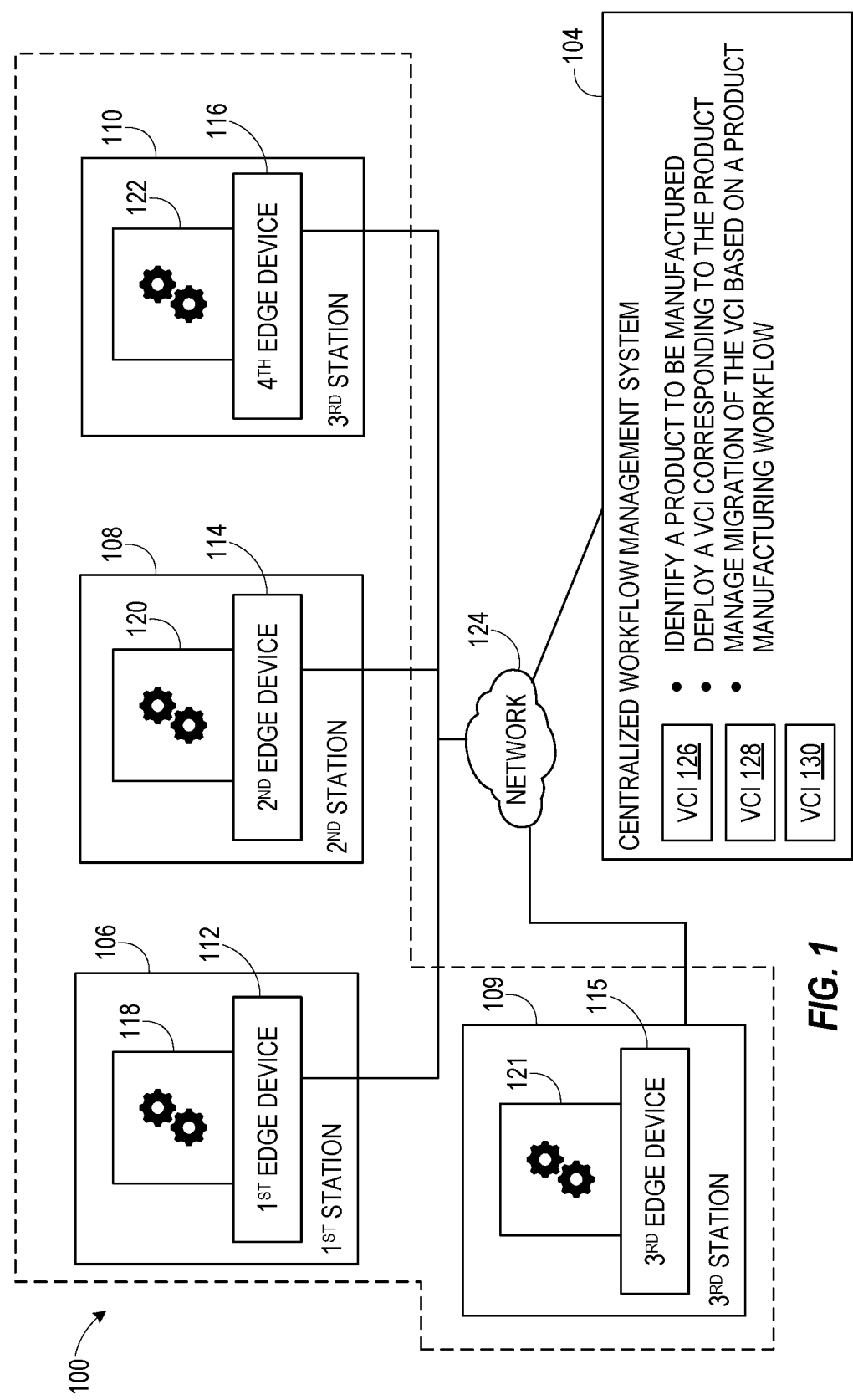
FIG. 1 depicts an example manufacturing system including a manufacturing assembly line controlled via an example centralized workflow management system.

It is emphasized that, in the drawings, various features are not drawn to scale. In fact, in the drawings, the dimensions of the various features have been arbitrarily increased or reduced for clarity of discussion.

DETAILED DESCRIPTION

Manufacturing setups generally include manufacturing lines having several manufacturing and/or assembling stations. These stations host equipment and machinery to perform designated tasks. Typically, the machinery hosted at such stations functions under the control of special-purpose computing devices. As these computing devices are designed for a respective specific purpose to perform given one or more tasks at the respective stations. Hence, such computing devices are most likely designed to have limited resources. In particular, these computing devices have limited storage and/or compute capabilities in comparison to typical computing systems hosted in datacenter or cloud environments.

Generally, in the manufacturing lines that are designed to produce diverse types of products, these computing systems are preprogrammed with all of the program instructions and data to aid in the manufacturing of such diverse products. With the limited storage and/or compute capabilities of the computing devices hosted in the manufacturing lines, the size of the program code and the data that can be stored on such computing devices are also limited. This results in a limit on the diversity in the types of products that can be manufactured via the manufacturing line. Alternatively, manufacturing lines can be equipped with high-end computing systems (e.g., with increased compute and storage capabilities) at the cost of increased capital expenditure to meet the demand of manufacturing the diverse types of products.

Moreover, manufacturing workflows executed on the manufacturing lines are traditionally monitored and controlled using sensors and controllers distributed across various stations. The sensors and controllers transact information with a central computing system which is often hosted in an on-site datacenter or even in a remote datacenter. In such distributed computing systems, monitoring and control workflows operate differently than the traditional central computing systems. Particular information or decisions may be contained in a certain device, and not inherently shared with the system as a whole. Many deployments of these distributed monitoring and control systems rely on proprietary solutions for monitoring, synchronizing, and controlling the overall workflow across distributed computing devices. Additionally, the use of excessive sensors and controllers for monitoring purposes also adds to the capital expenditure on the manufacturing lines.

In accordance with the aspects of the present disclosure, a method and a centralized workflow management system are presented that facilitate the manufacturing of diverse types of products without the computing devices, hosted in a manufacturing line, requiring to store program instructions for each of the diverse types of products at the same time. In particular, in some examples, the proposed centralized workflow management system hosts an orchestration manager for each product type and a virtual computing instance corresponding to each product to be manufactured. A virtual computing instance corresponding to a given product is a packaged solution including processor-executable instructions and/or data that is useful to enable manufacturing of the given product via the manufacturing line.

In some examples, the centralized workflow management system selects an orchestration manager depending on an identity of the product to be manufactured. The selected orchestration manager then deploys a virtual computing instance corresponding to the product to be manufactured on a first computing device to execute a first stage of a respective product manufacturing workflow. Once the product completes the first stage, the orchestration manager migrates the virtual computing instance on a second computing system to execute a second stage of the product manufacturing workflow. In particular, the migration of the virtual computing instance includes removing the virtual computing instance from the first computing device and deploying the virtual computing instance to the second computing device. As the virtual computing instance is removed from the first computing device after the first computing device has finished executing the first stage, the storage space that was occupied on the first computing device by the virtual computing instance is released for other functions. Moreover, the virtual computing instances for several products are stored on the centralized workflow management as opposed to storing them on the manufacturing line. This allows for using computing devices with reduced storage capacity on the manufacturing line, resulting in a reduction in overall capital expenditure on the manufacturing line.

Furthermore, in some examples, the centralized workflow management system facilitates both control and monitoring of the product manufacturing workflows. In particular, the virtual computing instances are configured to update the status of respective product manufacturing stages in a centralized repository as state data. An orchestration manager monitors the state data to determine whether the product has completed the manufacturing stages that it was undergoing. The orchestration manager uses this information to determine when to migrate the virtual computing instance. As the virtual computing instances are configured to self-monitor the completion of the manufacturing stage that its executing, the use of excessive monitoring sensors may be minimized. A reduction in the number of such monitoring sensors further lowers overall capital expenditure on the manufacturing line.

Referring now to the drawings, in FIG. 1, an example manufacturing system 100 is depicted. The manufacturing system 100 may include a manufacturing line 102 and an example centralized workflow management system (CWMS) 104. The CWMS 104 controls the manufacturing line 102 to manufacture diverse types of products via the manufacturing line 102. For illustration purposes, in the examples described herein, the CWMS 104 is described as configured to control the manufacturing of diverse types of products such as products A, B, and C via the manufacturing line 102. For example, products A and B belong to a first product type whereas product C belongs to a second product type. By way of example, products A and B may be different variants of a car (i.e., the first product type being "car") with different body colors, and product C may be a variant of a sports utility truck (SUT) (i.e., the second product type being "SUT"). The manufacturing line 102 may refer to a facility including several stations that are equipped with tools and/or machinery through which several parts of products can be manufactured and/or assembled to form a final finished product. In the description hereinafter products A, B, and C are also interchangeably referred to as a first product, a second product, and a third product.

The manufacturing line 102 may include a plurality of stations that host equipment and machinery to perform operations to manufacture a variety of products. For illustration purposes, in FIG. 1, the manufacturing line 102 is shown to include four stations, such as, stations 106, 108, 109, and 110 (hereinafter collectively referred to as stations 106-110). Each of the stations 106-110 is associated with a respective stage of manufacturing. A manufacturing stage defines an operation performed at the given station. For example, the manufacturing stages associated with the stations 106, 109, 108, and 110 may be a first type production stage, a second type production stage, a finishing (e.g., painting) stage, and a quality check (QC) stage, respectively. Although four stations 106-110 are shown in the manufacturing line 102, a manufacturing line 102 using more or fewer stations is also envisioned within the purview of the present disclosure.

Further, the manufacturing line 102 may include a plurality of computing devices, for example, a first computing device 112, a second computing device 114, a third computing device 115, and a fourth computing device 116 (hereinafter collectively referred to as computing devices 112-116) located at the stations 106, 108, 109, and 110, respectively. The computing devices 112-116 are capable of executing program instructions and/or storing and retrieving data to control the functionality of electromechanical equipment/machinery. Examples of the computing devices 112-116 may include, but are not limited to, computing nodes, such as a server, a computer appliance, a workstation, edge devices, a microcontroller and/or microprocessor-based control systems, and the like. In some examples, the computing devices 112-116 are resource constrained edge devices. For example, the computing devices 112-116 may have reduced computing and storage capabilities in comparison to computing devices hosted in a typical datacenter or cloud environment.

In the example implementation of FIG. 1, the manufacturing line 102 is shown to include electromechanical equipment 118, 120, 121, and 122 (hereinafter collectively referred to as machines 118-122) hosted at the stations 106, 108, 109, and 110, respectively. The machines 118-122 may be robotic arms (or any other machinery) that can perform a specific task, e.g., moving, placing, welding, screwing, unscrewing, painting, polishing, packaging, labeling, etc. In some examples, the computing devices 112, 114, 115, and 116 may be respectively deployed within the machines 118, 120, 121, and 122 or operatively coupled to the machines 118, 120, 121, and 122 to control functionalities thereof, based on execution of program instructions. In particular, the computing devices 112-116 are configured to control respective machines 118-122 to perform operations needed to accomplish respective manufacturing stages of a product manufacturing workflow. It is to be noted that the scope of the present disclosure is not limited with respect to the number and types of the machines 118-122 and computing devices 112-116; the kind of operations that can be performed by such machines 118-122; and/or the number and types of products that can be manufactured on the manufacturing line 102.

The CWMS 104 enables the production of diverse products via the manufacturing line 102 without requiring the computing devices 112-116 to store program instructions for all of the products at the same time. In particular, for a given product to be manufactured via the manufacturing line 102, the CWMS 104 pushes a respective code logic to the computing devices 112-116 according to a product manufacturing workflow corresponding to a product type of the given product. The product manufacturing workflow defines stages of manufacturing for the given product type. In accordance with aspects of the present disclosure, the code logic may include processor-executable instructions and/or data as a packaged solution. The packaged solution may be in the form of a virtual computing instance (VCI) (described later). The VCI may be deployed through one or more computing devices depending on the product manufacturing workflow and a manufacturing stage associated with the one or more computing devices 112-116. This orchestration of the VCI is performed in a manner that enables computing devices, such as, the computing devices 112-116, with limited resources to execute code logic for manufacturing diverse types of products.

In some examples, the CWMS 104 may be configured to control deployment and migration of a VCI on the computing devices 112-116 depending on the identity of the product that is to be manufactured via the manufacturing line 102. The term 'deploy' as used herein is used to refer to installing a computing resource such as a VCI on a host device, for example, any of the computing devices 112-116. The CWMS 104 may be implemented as a hardware system such as a desktop computer, a laptop, a smartphone, a server, a computer appliance, a workstation, a storage system, and the like. In some other examples, the CWMS 104 may be implemented as a software solution via software resources, such as but not limited to, application (e.g., software program), a virtual machine, a container, or a pod. In one example, the CWMS 104 may be a turnkey solution or an integrated product. In some examples, the terms "turnkey solution" or "integrated product" may refer to a ready for use packaged solution or a product including various modules that form the CWMS 104 are all disposed within a common enclosure, a common rack, or a common computing system (e.g., a physical computing node).

Moreover, in some examples, the CWMS 104 may be a distributed system where operations performed by the CWMS 104 may be performed by computing resources (physical or virtual) that are distributed and connected via a network. In some examples, the CWMS 104 may be hosted in a Kubernetes cluster and the plurality of computing devices 112-116 are connected to the Kubernetes cluster as managed devices. In particular, in some examples, the CWMS 104 may be hosted in a management node running Kubernetes management operations and the plurality of computing devices 112-116 are connected to the CWMS 104 as managed devices.

The CWMS 104 may be communicatively coupled to the computing devices 112-116 via a network 124. Examples of the network 124 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 124 may include one or more network switches, routers, or network gateways to facilitate data communication. Communication over the network 124 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 124 may be enabled via a wired (e.g., copper, optical communication, etc.) or wireless (e.g., Wi-Fi®, cellular communication, satellite communication, Bluetooth, etc.) communication technologies. In some examples, the network 124 may be enabled via private communication links including, but not limited to, communication links established via Bluetooth, cellular communication, optical communication, radio frequency communication, wired (e.g., copper), and the like. The private communication links may be direct communication links between the CWMS 104 and the computing devices 112-116.

The CWMS 104 may host a centralized data store that stores one or more virtual computing instances (VCIs), for example, a first VCI 126, a second VCI 128, and a third VCI 130, including code logic to manufacture a product from the plurality of products, e.g., the products A, B, and C, respectively, the first VCI 126, the second VCI 128, and the third VCI 130 are hereinafter collectively referred to as VCIs 126-130. The VCIs 126-130, may include instructions execution of which by one or more of the computing devices 112-116 may control functionalities of the respective machines 118-122 to execute respective manufacturing stages. The VCIs 126-130 may be implemented as computing resources such as, but not limited to, applications (e.g., software program), virtual machines, containers, or pods.

As will be understood, a VCI such as a virtual machine may include an instance of an operating system hosted in a given computing device. Further, a VCI such as a container may be an application packaged with its dependencies (e.g., operating system resources, processing allocations, memory allocations, etc.) hosted in a given computing device via a container host program such as a container runtime (e.g., Docker Engine), for example. Further, in some examples, one or more containers may be grouped to form a pod. For example, a set of containers that are associated with a common application may be grouped to form a pod. It is to be noted that the scope of the present disclosure is not limited with respect to the types of the VCIs.

The CWMS 104 maintains a mapping of products (e.g., a product A, a product B, and a product C) to be manufactured, respective product types, and respective product manufacturing workflows. The product manufacturing workflows may be defined with respect to each of the product types. For example, a first product manufacturing workflow may be defined for the first product type and a second product manufacturing workflow may be defined for the second product type. The first and second product manufacturing workflows may define sequences of manufacturing stages respectively for the first and second product types.

In some examples, a first product manufacturing workflow corresponding to the first product type (e.g., for the products A and B) may define, in the listed order, a sequence of two manufacturing stages-a first stage (e.g., the first type production stage) and a second stage (e.g., a finishing stage, that can be performed via the first computing device 112 and the second computing device 114, respectively. Accordingly, to facilitate manufacturing of the first product (e.g., product A), the CWMS 104 may select the first VCI 126 corresponding to product A and deploy the selected VCI on the first computing device 112. The execution of the first VCI 126 on the first computing device 112 may cause the first computing device 112 to execute the first stage of the first product manufacturing workflow via the respective machine 118. Further, according to the first product manufacturing workflow, the CWMS 104 may migrate the first VCI 126 to the second computing device 114 upon determining that the first computing device 112 has finished executing the first stage of the first product manufacturing workflow.

The migration of the first VCI 126, may include removing the first VCI 126 from the first computing device 112 and deploying the first VCI 126 to the second computing device 114 by the CWMS 104. In some examples, the first VCI 126 may be pushed to the second computing device 114 from the CWMS 104. Once migrated to the second computing device 114, the first VCI 126 may cause the second computing device 114 to execute the second stage of the first product manufacturing workflow via the respective machine 120. As will be appreciated, migrating the first virtualized computing instance 126 reduces resource utilization on the first and second computing devices. The term "resource utilization" as used herein may refer to a usage of a storage space. In particular, upon migration of the first VCI 126 to the second computing device 114, the first computing device 112 no longer stores the first VCI 126 (as the VCI 126 is removed/ deleted from the first computing device 112), thereby releasing the storage space on the first computing device 112 for other functions (e.g., to store another VCIs and/or data).

Similarly, in some examples, a second product manufacturing workflow to manufacture a third product (e.g., a product C) may define, in the listed order, three manufacturing stages-a first stage (e.g., a second type production stage), a second stage (e.g., a finishing stage), and a third stage (e.g., a QC check). To manufacture the third product, the CWMS 104 may select the third VCI 130 corresponding to the third product and deploy it on the third computing device 115. Then, based on the second product manufacturing workflow, the CWMS 104 may migrate the third VCI 130 to the second computing device 114 upon determining that the third computing device 115 has finished executing the first stage of the second product manufacturing workflow. Such migration of the third VCI 130 to the second computing device 114, may include removing the third VCI 130 from the third computing device 115 and deploying the third VCI 130 to the second computing device 114 by the CWMS 104.

Once migrated to the second computing device 114, the third VCI 130 may cause the second computing device 114 to perform the second stage of the second product manufacturing workflow via the machine 120. Further, the CWMS 104 may migrate the second VCI 128 to the fourth computing device 116 upon determining that the second computing device 114 has finished performing the second stage of the second product manufacturing workflow. In a similar fashion noted hereinabove, the third VCI 130 may be removed from the second computing device 114 and deployed on the fourth computing device 116. Once migrated to the fourth computing device 116, the third VCI 130 may cause the fourth computing device 116 to execute the third stage of the second product manufacturing workflow via the respective machine 122.

In accordance with aspects of the present disclosure, the VCIs, which may include manufacturing instructions corresponding to several products, are stored centrally at the CWMS 104. Depending on the product to be manufactured, a VCI is selected and is deployed and migrated from one computing device to another computing device from time to time depending on the completion of respective manufacturing stages and respective product manufacturing workflows. Such centralized storage and orchestration of the VCIs (e.g., the VCIs 126-130) enable manufacturing of diverse products (e.g., the products A, B, and C) without requiring the computing devices 112-116 to store several VCIs (e.g., the VCIs 126-130) at the same time.

Figure 2:
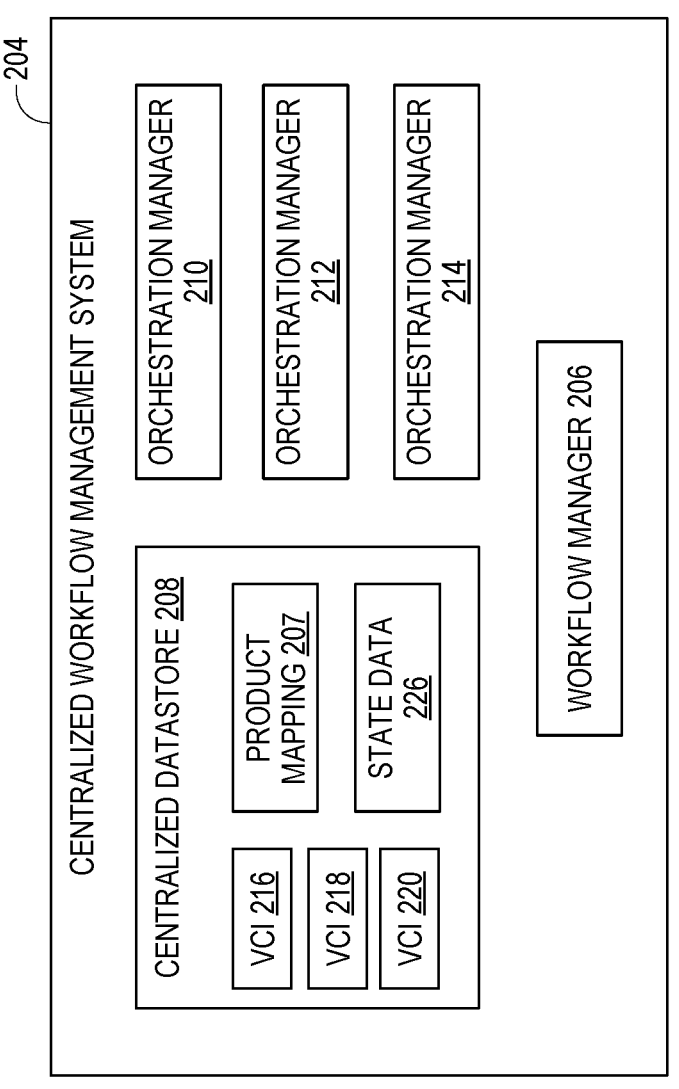
FIG. 2 depicts a block diagram of an example centralized workflow management system.

Referring now to FIG. 2, a block diagram of an example CWMS 204 is depicted. The CWMS 204 may be an example representative of the CWMS 104 and which may be deployed in a manufacturing system such as the manufacturing system 100 of FIG. 1. For illustration purposes, operations performed by the CWMS 204 are described as if the CWMS 204 is deployed in the manufacturing system 100 in place of the CWMS 104. However, the CWMS 204 should not be construed to be limited to the example configuration of the manufacturing system 100, for example, with respect to the number of stations, computing devices, machines, etc.

In some examples, the CWMS 204 may include workload resources such as, but not limited to, a workflow manager 206, a centralized data store 208, and a plurality of orchestration managers. In the example implementation of FIG. 2, the CWMS 204 is shown to host two orchestration managers—a first orchestration manager 210 and a second orchestration manager 212. The number of the orchestration managers that the CWMS 204 may include depends on the number of different product types that the CWMS 204 can manage to manufacture. The workflow manager 206, the centralized data store 208, and the plurality of orchestration managers 210-212 may be hardware or software resources. For example, one or more of the workflow manager 206 and the orchestration managers 210-212 may be implemented as applications (e.g., software programs), virtual machines, containers, or pods; and the centralized data store 208 may be implemented as a virtual data store. The workload resources in such software-based implementation may be hosted in a single host computing system or may be distributed across a plurality of host computing systems. In some other examples, the workflow manager 206, and the plurality of orchestration managers 210-212 may be implemented as separate computing systems (e.g., stationary or portable); and the centralized data store 208 may be implemented as a storage system.

The computing systems operating as or hosting the workflow manager 206, the centralized data store 208, and the plurality of orchestration managers 210-212 may include a processing resource (not shown) and a machine-readable medium (not shown). The machine-readable medium may be any electronic, magnetic, optical, or any other storage device that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CD-ROM), and the like. The machine-readable medium may be non-transitory. Further, the processing resource may be a physical device, for example, a central processing unit (CPU), a microprocessor, graphics processing unit (GPU), application-specific integrated circuit (ASIC), a field-programmable gate array (FPGA), other hardware devices capable of retrieving and executing instructions stored in the machine-readable medium, or combinations thereof. The processing resource may fetch, decode, and execute the instructions stored in the machine-readable medium to manage deployment and migration of the VCI (described further below). As an alternative or in addition to executing the instructions, the processing resource may include at least one integrated circuit (IC), control logic, electronic circuits, or combinations thereof that include a number of electronic components for performing the functionalities intended to be performed by the CWMS 204.

In one example, the centralized data store 208 may store a plurality of VCIs 216, 218, 220 that are example representatives of the VCIs 126, 128, and 130, respectively, shown in FIG. 1. The VCIs 216, 218, 220 may be designed to include several program instructions execution of which by one or more of the computing devices 112-116 may control functionalities of the machines 118-122 to manufacture products, for example, the products A, B, and C, respectively. In some examples, the first VCI 216 may include a first configuration of manufacturing parameters corresponding to the first product (e.g., product A). Further, the second VCI 218 may include a second configuration of the manufacturing parameters corresponding to the second product (e.g., product B). The third VCI 220 may include a third configuration of the manufacturing parameters corresponding to the third product (e.g., product B). The manufacturing parameters for a given product may include specifics corresponding to one or more features (e.g., color, style, number of seats, transmission types, etc.) of the given product. For example, the first product and the second product that are belonging to the first product type may have different requirements with respect to a manufacturing parameter-a body color. Accordingly, the first VCI may have different configuration than the second VCI. It is to be noted that the scope of the present disclosure is not limited with respect to examples of the specifics corresponding to the features listed hereinabove.

Further, the orchestration managers 210 and 212 may include program instructions to manage deployment and migration of the respective VCIs depending on respective product manufacturing workflows. For example, the first orchestration manager 210 may include the logic to execute the first product manufacturing workflow to facilitate the manufacturing of products (e.g., products A and B) belonging to the first product type. Similarly, the second orchestration manager 212 may include the logic to execute the second product manufacturing workflow to facilitate the manufacturing of products (e.g., product C) belonging to the second product type.

The centralized data store 208 may also store a mapping, hereinafter referred to as a product mapping 207. The product mapping 207 is a mapping, between product identifiers, product types, the VCIs, and the orchestration managers. A product identifier is a sequence of numbers, letters, symbols, and/or special characters that uniquely identify a product to be manufactured on the manufacturing line 102. Table-1 presented below shows an example product mapping 207 that may be stored in the centralized data store 208.

TABLE 1

| | | Example product mapping | | |
|---|---|---|---|---|
| Product identifier | Product | Product Type | VCI | Orchestration manager |
| 12456 | A | First product type | 216 | 210 |
| 46546 | B | First product type | 218 | 212 |
| 22332 | C | Second product type | 220 | 214 |

For illustration purposes, numeric product identifiers are listed in Table-1. As depicted in Table-1, the product identifiers "12456," "46546," and "22332" corresponds to products A, B, and C, respectively. As previously noted, products A and B may belong to a first product type and product C may belong to the second product type. Further, Table-1 indicates that the products A, B, and C may be manufactured via execution of the VCIs 216, 218, and 220, respectively, via the computing devices 112-116 on the manufacturing line 102. The orchestration (e.g., deployment and migration) of the VCIs 216, 218 may be controlled via the first orchestration manager 210, and the orchestration of the VCI 220 may be controlled via the second orchestration manager 212.

Further, in some examples, the first orchestration manager 210 is preconfigured with the first product manufacturing workflow and details of the manufacturing stages associated with the plurality of computing devices 112, 114. Table-2 presented below represents an example configuration of the first product manufacturing workflow.

TABLE 2

| | Example first product manufacturing workflow | |
|---|---|---|
| Order | Manufacturing stage | Target Computing device |
| 1 | First stage | 112 |
| 2 | Second stage | 114 |

As shown in Table-2, the first product manufacturing workflow includes the first stage followed by the second stage. To manufacture the first product, as per the example configuration of Table-2, the first orchestration manager 210 is configured to deploy the first VCI 216 on the first computing device 112 and the second computing device 114 in the order shown in Table-2. Similarly, to manufacture the second product, as per the example configuration of Table-2, the first orchestration manager 210 is configured to deploy the second VCI 218 on the first computing device 112 and the second computing device 114 in the order shown in Table-2. Example operations performed by an orchestration manager 210 are described in conjunction with the method of FIG. 4.

Also, in some examples, the second orchestration manager 212 is preconfigured with the second product manufacturing workflow and details of the manufacturing stages associated with the plurality of computing devices 112, 114. Table-3 presented below represents an example configuration of the second product manufacturing workflow.

TABLE 3

| | Example second product manufacturing workflow | |
|---|---|---|
| Order | Manufacturing stage | Target Computing device |
| 1 | First stage | 115 |
| 2 | Second stage | 114 |
| 3 | Third stage | 116 |

As shown in Table-3, the second product manufacturing workflow includes a first stage followed by a second stage and a third stage. To manufacture the third product (e.g., product C), as per the example configuration of Table-3, the second orchestration manager 212 is configured to deploy the third VCI 220 on the third computing device 115, the second computing device 114, and the fourth computing device 116 in the order shown in Table-3. Operations performed by the second orchestration manager 212 to control the deployment and migration of the third VCI 220 are described in conjunction with FIG. 6.

Further, the VCIs 216-220, during respective executions, may periodically update the state of a manufacturing stage being performed via the respective computing device as a state data 226 in the centralized data store 208. In some other examples, a given VCI updates the state data 226 upon completion of the respective manufacturing stage. The state may indicate whether the manufacturing stage has been completed or is ongoing. The state of the manufacturing stage may be represented as a sequence of numbers, alphabets, symbols, and/or special characters that uniquely identify the status of the operation. In one example, the state may be represented as a text "ONGOING" to indicate that the manufacturing stage is ongoing, or as a text "COMPLETED" to indicate that the manufacturing stage is completed.

In some examples, the workflow manager 206 refers to the product mapping 207 to select an appropriate orchestration manager depending on the product to be manufactured. The selected orchestration manager may deploy the respective VCI on a computing device depending on the respective product manufacturing workflow. Further, the selected orchestration manager monitors the state data 226 to control the migration of the respective VCI on one or more of the computing devices 112-116 on the manufacturing line 102. Details of the operations performed by the workflow manager 206 are described in conjunction with the methods of FIG. 3.

Methods of FIGS. 3-6 may represent an example logical flow of some of the several operations performed by the CWMS 204 to manage deployment and migration of VCIs. However, in some other examples, the order of execution of the method blocks depicted in FIGS. 3-6 may be different than the order shown. Certain details of the operations performed by the CWMS 204 described in FIGS. 1-2 are not repeated herein for the sake of brevity. Further, for illustration purposes, the methods of FIGS. 3-6 are described in conjunction with the manufacturing system 100 of FIG. 1, but the methods should not be construed to be limited to the example configuration of the manufacturing system 100 (e.g., with respect to the number of stations, computing devices, machines, etc.).

Referring now to FIG. 3, a flow diagram depicting an example method 300 for selecting an orchestration manager of the orchestration managers 210-212 is presented. The method 300 includes method blocks 302, 304, 306, and 308 (hereinafter collectively referred to as blocks 302-308) which may be performed by a processor-based system such as, for example, the CWMS 204. In particular, in some examples, operations at each of the method blocks 302-308 may be performed by the workflow manager 206 of FIG. 2 which is also referenced herein concurrently.

During operation, at block 302, the workflow manager 206 may receive a product identifier. In some examples, the workflow manager 206 may receive the product identifier from the manufacturing line 102 responsive to scanning a tag (e.g., a barcode, quick response code, radio-frequency identification tag, near-field communication tag, Bluetooth tracking device) via a scanner (not shown) or by way of a manual entry of the product identifier by an operator. Upon receiving the product identifier, the workflow manager 206, at block 304, may identify the product to be manufactured based on the product identifier. In some examples, the workflow manager 206 may perform a look-up in the product mapping 207 stored in the centralized data store 208. For example, if the workflow manager 206 receives "12456" as a product identifier, the workflow manager 206 may refer to the product mapping 207 and determine that product A is to be manufactured and it needs to deploy a corresponding VCI on the manufacturing line 102.

Further, at block 306, the workflow manager 206 may select an orchestration manager corresponding to the product type of the product (identified at block 304) from the plurality of orchestration managers 210 and 212. In some examples, the workflow manager 206 may perform a look-up in the product mapping 207 for the product identified at block 304. For example, for product A identified at block 304 and based on the product mapping 207, the workflow manager 206 may select the first orchestration manager 210. Moreover, at block 308, the workflow manager 206 may run (i.e., execute) the selected orchestration manager (e.g., the first orchestration manager 210). Upon execution, the selected orchestration manager may control deployment and migration of the respective VCI on the computing devices according to the respective product manufacturing workflow. For example, upon execution, the first orchestration manager 210 may control deployment and migration of the VCI 216 on the computing devices 112, 114 according to the first product manufacturing workflow. Details of operations performed by the first orchestration manager 210 are described in conjunction with the methods described in FIGS. 4 and 5.

FIG. 4 depicts a flow diagram of an example method 400 for managing the deployment and migration of a VCI on computing devices. The method 400 may be performed by a processor-based system such as, for example, the CWMS 204. In some examples, operations at each of the method blocks of the method 400 may be performed by the orchestration manager executed at block 308 of method 300. For example, to enable manufacturing of the first product, the first orchestration manager 210 is executed at the block 308 of method 300.

As previously noted, the first orchestration manager 210 is configured to execute the first product manufacturing workflow (see Table-2). Accordingly, the first orchestration manager 210, at block 402, deploys the first VCI 216 on the first computing device 112. Upon successful deployment on the first computing device 112, the VCI 216 is executed on the first computing device 112. The first VCI 216, when executed, causes the first computing device 112 to execute the first stage of the first product manufacturing workflow. Also, the first orchestration manager 210 monitors the status of the first stage of the first product manufacturing workflow. At block 404, the first orchestration manager 210, performs a check to determine whether the first product has completed the first stage of the first product manufacturing workflow. In some examples, the first orchestration manager 210 determines whether the first product has completed the first stage by monitoring state data 226 in the centralized data store 208. Details of the check performed at the block 404 are described in the method of FIG. 5. At block 404, if it is determined that the first product has not completed the first stage of the first product manufacturing workflow (e.g., the first stage is still being executed), the first orchestration manager 210 continues to monitor the status of the first stage of the first product manufacturing workflow.

At block 404, if it is determined that the computing device 112 has completed the first operation, the first orchestration manager 210, at block 406, migrates the first VCI 216 to the second computing device 114 to execute the second stage of the first product manufacturing workflow (see Table-2). To perform the migration of the first VCI 216, the first orchestration manager 210 may uninstall/remove the first VCI 216 from the first computing device 112 and deploy the first VCI 216 on the second computing device 114. The VCI 216 may be pushed to the second computing device 114 from the centralized data store 208. Upon successful deployment on the second computing device 114, the first VCI 216 is executed on the second computing device 114. The execution of the VCI 216 on the second computing device 114 causes the second computing device 114 to execute the second stage of the first product manufacturing workflow.

In some examples, the first VCI 216 may generate data during its execution. The first VCI 216 may store such data in the centralized data store 208. Similarly, in some examples, the first VCI 216 may use/retrieve data and/or program instructions stored in the centralized data store 208. Use of the centralized data store 208 to retrieve and/or store data by the first VCI 216 may save storage space on the computing devices 112-116. Alternatively, the computing devices 112-116 having reduced storage capacity may be used resulting in the reduction in the overall cost of the manufacturing line 102. Further, the VCIs (e.g., the VCIs 216, 218, and 220) including manufacturing instructions corresponding to several products (e.g., the products A, B, and C) are stored centrally at the CWMS 204. Depending on the product to be manufactured, a VCI is selected and which is migrated from one computing device to another computing device from time to time depending on the completion of respective manufacturing stages by the computing devices and the respective product manufacturing workflows, as described hereinabove. Such centralized storage and orchestration of the VCIs enable the manufacturing of diverse products without requiring the computing devices 112-116 to store several VCIs at the same time.

Figure 5:
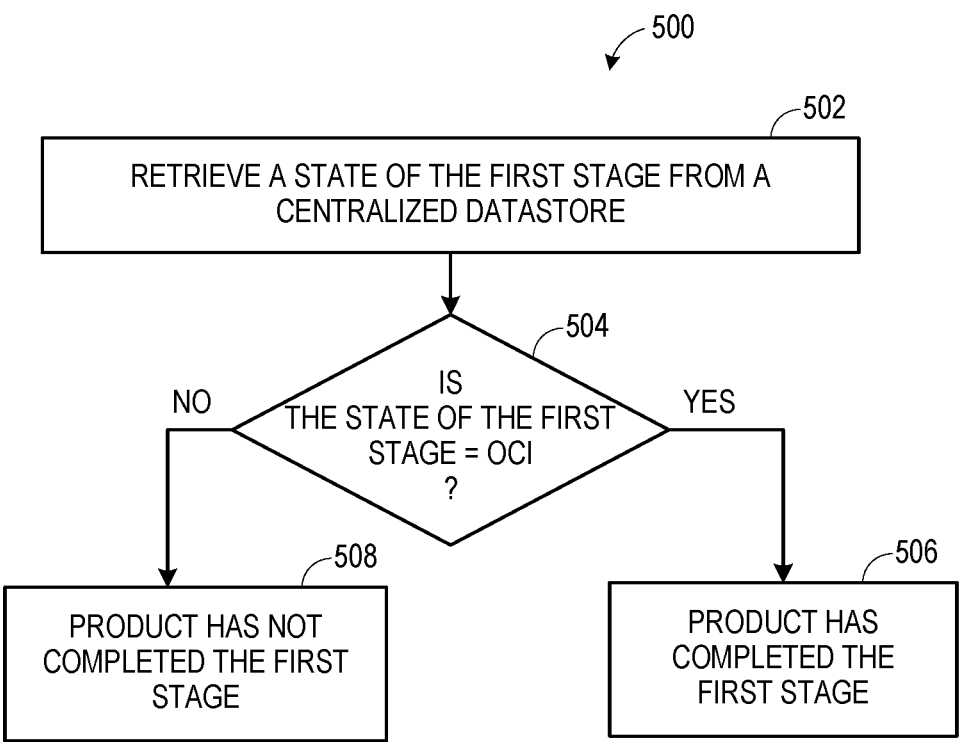
FIG. 5 depicts an example method for determining whether a product has completed a manufacturing stage of a product manufacturing workflow.

Referring now to FIG. 5, a flow diagram of an example method 500 for determining the completion of a manufacturing stage is presented. Although the method 500 is described with reference to the first orchestration manager 210, the techniques described herein are also applicable to the second orchestration manager 212. In some examples, the method 500 represents method blocks describing operations performed at block 404 of FIG. 4.

At block 502, the first orchestration manager 210 retrieves a state of the first stage of the first product manufacturing workflow from the centralized data store 208. In one example, the state may be represented as a text "ONGO-ING" to indicate that the first product is still undergoing the first stage of the first product manufacturing workflow. In another example, the state may be represented as a text "COMPLETED" to indicate that the first product has completed the first stage of the first product manufacturing workflow. In some examples, the first VCI 216 periodically updates the state of the first stage of the first product manufacturing workflow as the state data 226 in the centralized data store 208. In some other examples, the VCI 216 updates the state data 226 upon completion of the first stage of the first product manufacturing workflow. The state may indicate whether the first stage of the first product manufacturing workflow has been completed or is ongoing. At block 502, the first orchestration manager 210 may retrieve such state from the state data 226.

Further, at block 504, the first orchestration manager 210 may perform a check to determine whether the state (retrieved at block 502) matches with an operation completion identifier (OCI). The OCI may be a sequence of numbers, alphabets, symbols, and/or special characters that uniquely identify that an operation is completed. In an example, the OCI may be a predefined text "COMPLETE." At block 504, if it is determined that the state matches with the OCI, the first orchestration manager 210, at block 506, determines that the first product has completed the first stage of the first product manufacturing workflow. However, at block 504, if it is determined by the first orchestration manager 210 that the state does not match with the OCI, the first orchestration manager 210, at block 508, determines that the first product is undergoing the first stage of the first product manufacturing workflow.

Figure 6:
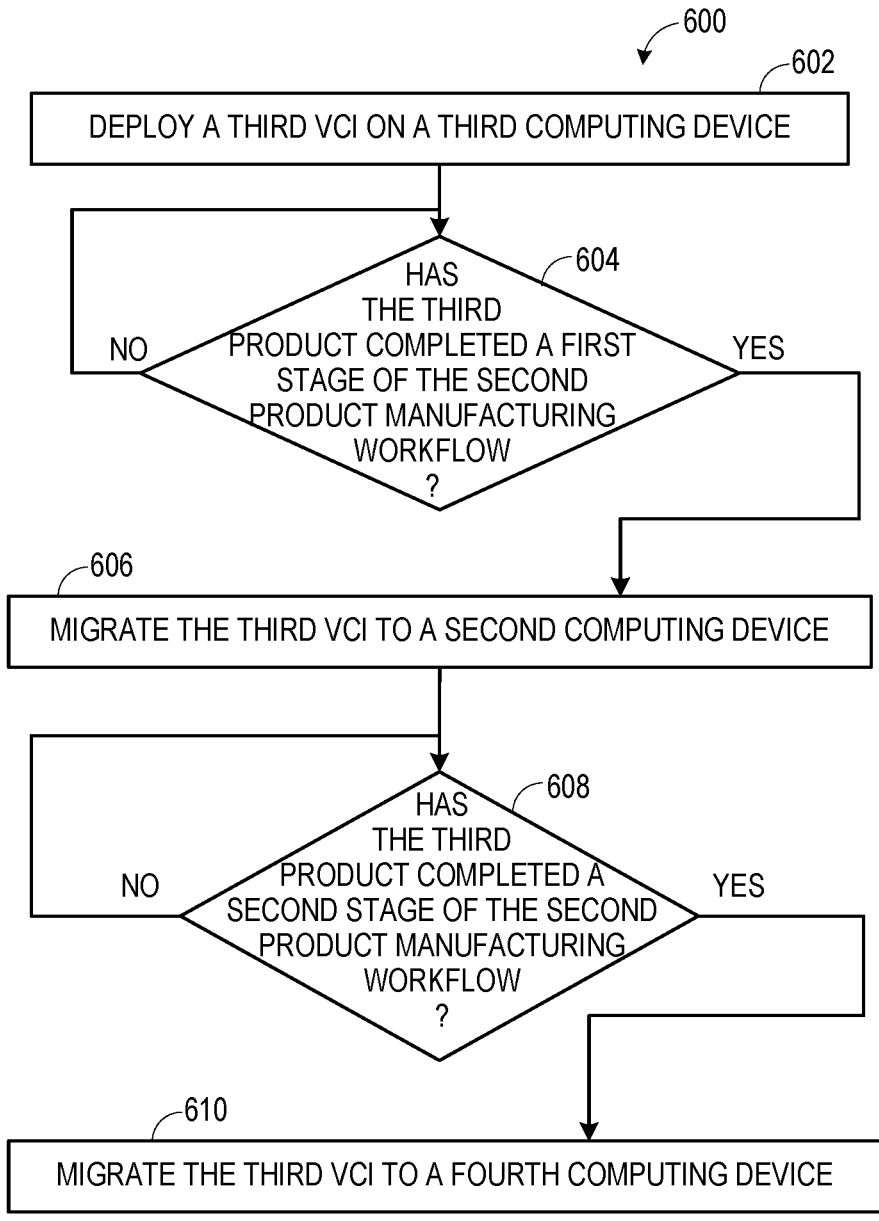
FIG. 6 depicts another example method for managing the deployment and migration of a virtual computing instance through computing devices on a manufacturing line.

A method for enabling the manufacturing of a different type of product (e.g., the third product, such as, product C, belonging to the second product type) is described in conjunction with FIG. 6. In particular, FIG. 6 depicts a flow diagram of an example method 600 for managing the deployment and migration of a VCI (e.g., the third VCI) on one or more computing devices. The method 400 may be performed by a processor-based system such as, for example, the CWMS 204. In some examples, operations at each of the method blocks of the method 400 may be performed by the orchestration manager executed at block 308 of method 300. For example, to enable manufacturing of the third product, the second orchestration manager 212 is selected (at the block 306 of the method 300) and is executed (at the block 308 of the method 300).

As previously noted, the second orchestration manager 212 is configured to execute the second product manufacturing workflow (see Table-3). Accordingly, the second orchestration manager 212, at block 602, deploys the third VCI 220 on the third computing device 115. The third VCI 220, when executed, causes the third computing device 115 to execute the first stage of the second product manufacturing workflow. Also, the second orchestration manager 212 monitors the status of the first stage of the second product manufacturing workflow. At block 604, the second orchestration manager 212, performs a check to determine whether the third product has completed the first stage of the second product manufacturing workflow (e.g., in a similar fashion as described in conjunction with FIG. 4). At block 604, if it is determined that the third product has not completed the first stage of the second product manufacturing workflow (e.g., the first stage is still being executed), the second orchestration manager 212 continues to monitor the status of the first stage of the second product manufacturing workflow.

At block 604, if it is determined that the third computing device 115 has completed the first stage, the second orchestration manager 212, at block 606, migrates the third VCI 220 to the second computing device 114 to execute the second stage of the second product manufacturing workflow (see Table-3). Also, second orchestration manager 212 monitors the status of the second stage of the second product manufacturing workflow. At block 608, the second orchestration manager 212, performs a check to determine whether the third product has completed the second stage of the second product manufacturing workflow (e.g., in a similar fashion as described in conjunction with FIG. 4). At block 608, if it is determined that the third product has not completed the second stage of the second product manufacturing workflow (e.g., the second stage is still being executed), the second orchestration manager 212 continues to monitor the status of the second stage of the second product manufacturing workflow. Further, at block 608, if it is determined that the computing device 112 has completed the first stage, the second orchestration manager 212, at block 610, migrates the third VCI 220 to the fourth computing device 116 to execute the third stage of the second product manufacturing workflow (see Table-3).

Figure 7:
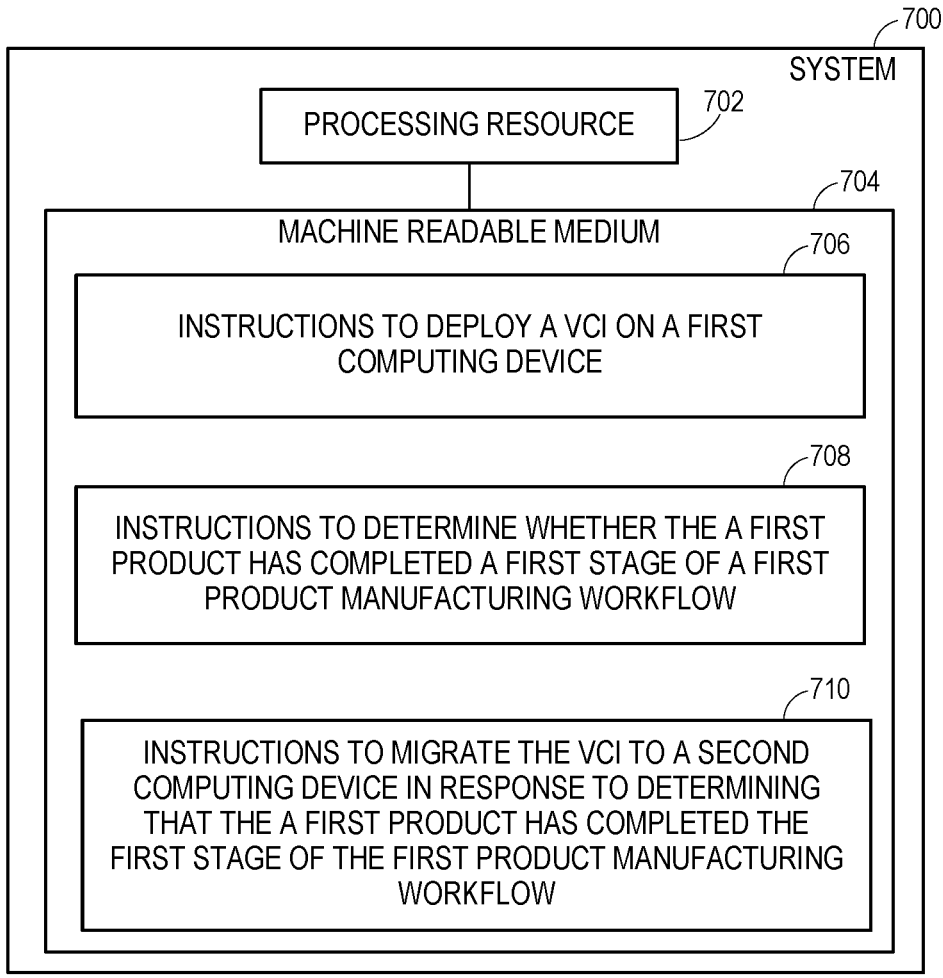
FIG. 7 is a block diagram of an example system depicting a processing resource and a machine-readable medium encoded with example instructions to facilitate the deployment and migration of a virtual computing instance.

Moving to FIG. 7, a block diagram of a system 700 depicting a processing resource 702 and a machine-readable medium 704 encoded with example instructions to facilitate deployment and migration of VCIs is presented, in accordance with an example. The system 700 may represent an example implementation of an orchestration manager, such as, any of the orchestration managers 210 and 212.

The machine-readable medium 704 may be non-transitory and is alternatively referred to as a non-transitory machine-readable medium 704. The machine-readable medium 704 may be any electronic, magnetic, optical, or any other storage device that may store data and/or executable instructions. Examples of the machine-readable medium 704 may include RAM, EEPROM, a storage drive, a flash memory, a CD-ROM, and the like. As described in detail herein, the machine-readable medium 704 may be encoded with executable instructions 706, 708, and 710 (hereinafter collectively referred to as instructions 706-710) for performing the method 400 described in FIG. 4. Although not shown, in some examples, the machine-readable medium 704 may be encoded with certain additional executable instructions to perform any other operations performed by the orchestration manager, without limiting the scope of the present disclosure.

The processing resource 702 may be a physical device, for example, a CPU, a microprocessor, a GPU, an ASIC, an FPGA, other hardware devices capable of retrieving and executing instructions stored in the machine-readable medium, or combinations thereof. The processing resource 702 may fetch, decode, and execute the instructions stored in the machine-readable medium 704 to manage deployment and migration of the VCI (e.g., the VCI 216). As an alternative or in addition to executing the instructions, the processing resource 702 may include at least one integrated circuit (IC), control logic, electronic circuits, or combinations thereof that include a number of electronic components for performing the functionalities intended to be performed by the orchestration manager.

The instructions 706 when executed by the processing resource 702 may cause the processing resource 702 to deploy a virtualized computing instance on a first computing device associated with a first stage of a product manufacturing workflow, wherein the virtualized computing instance is associated with a product undergoing the product manufacturing workflow. The instructions 708 when executed by the processing resource 702 may cause the processing resource 702 to determine whether the product has completed the first stage of the product manufacturing workflow. Further, the instructions 710 when executed by the processing resource 702 may cause the processing resource 702 to migrate, upon product completing the first stage, the virtualized computing instance from the first computing device to a second computing device associated with a second stage of the product manufacturing workflow.

The preceding detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the preceding detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A method comprising:

deploying, by a first orchestration manager hosted in a centralized workflow management system to manage workflows for a plurality of computing devices, a first virtualized computing instance on a first computing device of the plurality of computing devices associated with a production stage of a first product manufacturing workflow, wherein the first virtualized computing instance is associated with a first product undergoing the first product manufacturing workflow; and upon the first product completing the production stage of the first product manufacturing workflow, migrating, by the first orchestration manager, the first virtualized computing instance from the first computing device to a second computing device of the plurality of computing devices associated with a finishing stage, a quality check (QC) stage, or both, of the first product manufacturing workflow at least in part by the first orchestration manager removing the first virtualized computing instance from the first computing device.

2. The method of claim 1, wherein the first virtualized computing instance is a container, a virtual machine, an application, or a pod.

3. The method of claim 1, wherein the first virtualized computing instance comprises a first configuration of manufacturing parameters corresponding to the first product and first code logic corresponding to a first product type, wherein the first product corresponds to a part undergoing manufacturing to form a first finished product of the first product type according to the first product manufacturing workflow, wherein the first product manufacturing workflow corresponds to the first product type.

4. The method of claim 3, further comprising:

deploying, by the first orchestration manager, a second virtualized computing instance on the first computing device, wherein the second virtualized computing instance is associated with a second product undergoing a second product manufacturing workflow, and wherein the second product corresponds to a part undergoing manufacturing to form a second finished product of a second product type different from the first product type according to the second product manufacturing workflow; and upon the second product completing the production stage of the second product manufacturing workflow, migrating, by the first orchestration manager, the second virtualized computing instance from the first computing device to the second computing device at least in part by the first orchestration manager removing the second virtualized computing instance from the first computing device and deploying the second virtualized computing instance to the second computing device.

5. The method of claim 4, wherein the second virtualized computing instance is one or more additional containers comprising a second configuration of manufacturing parameters corresponding to the second product and second code logic, different from the first code logic, to manufacture the second finished product of the second product type according to the second product manufacturing workflow.

6. The method of claim 1, further comprising:

deploying, by a second orchestration manager hosted in the centralized workflow management system, a third virtualized computing instance on a third computing device of the plurality of computing devices, associated with a production stage of a second product manufacturing workflow, wherein the third virtualized computing instance is associated with a third product of a second product type undergoing the second product manufacturing workflow, and wherein the third virtualized computing instance comprises a third configuration of manufacturing parameters; and upon the third product completing the production stage of the second product manufacturing workflow, migrating, by the second orchestration manager, the third virtualized computing instance from the third computing device to a fourth computing device of the plurality of computing devices associated with a finishing stage, a quality check (QC) stage, or both, of the second product manufacturing workflow at least in part by the second orchestration manager removing the third virtualized computing instance from the third computing device and deploying the third virtualized computing instance to the fourth computing device.

7. The method of claim 1, wherein the first and second computing devices are resource constrained edge devices and migrating the first virtualized computing instance reduces resource utilization on the first and second computing devices, wherein the first virtualized computing instance is removed by the first orchestration manager from the first computing device after the first computing device has finished executing the production stage of the first product manufacturing workflow, and wherein storage space that was occupied on the first computing device by the first virtualized computing instance is released for other functions with removal.

8. The method of claim 1, wherein the first virtualized computing instance is stored in a centralized data store hosted on the centralized workflow management system, wherein a product mapping is stored in the centralized data store, wherein the product mapping associates an identifier of the first product with a first product type, the first virtualized computing instance, and the first orchestration manager.

9. The method of claim 8, further comprising determining that the first product has completed the production stage of the first product manufacturing workflow by monitoring state data in the centralized data store, the state data updated by the first virtualized computing instance when the first product completes the production stage of the first product manufacturing workflow.

10. A centralized workflow management system comprising:

a first processing resource configured to provide a workflow manager, wherein the workflow manager is configured to determine that a product to be manufactured via a manufacturing line is a first product of a first product type, wherein the manufacturing line hosts a plurality of computing devices comprising a first computing device and a second computing device; and a second processing resource configured to provide a first orchestration manager hosted in the centralized workflow management system to manage workflows for the plurality of computing devices, wherein the first orchestration manager corresponds to a first product manufacturing workflow, wherein the first orchestration manager is configured to:

deploy a first virtualized computing instance on the first computing device to execute a production stage of the first product manufacturing workflow, wherein the first virtualized computing instance is associated with the first product undergoing the first product manufacturing workflow; and upon the first product completing the production stage of the first product manufacturing workflow, migrate the first virtualized computing instance from the first computing device to the second computing device to execute a finishing stage, a quality check (QC) stage, or both, of the first product manufacturing workflow at least in part by the first orchestration manager removing the first virtualized computing instance from the first computing device.

11. The centralized workflow management system of claim 10, wherein the workflow manager is configured to:

receive a product identifier based on a scanning of at least one of a barcode, a quick response code, a radio-frequency identification tag, a near-field communication tag, or a Bluetooth tracking device; and identify, based on the product identifier, the product to be manufactured as the first product of the first product type.

12. The centralized workflow management system of claim 10, wherein the workflow manager is configured to:

select the first orchestration manager corresponding to the first product from a plurality of orchestration managers upon determining that the product to be manufactured is the first product; and run the first orchestration manager.

13. The centralized workflow management system of claim 12, further comprising a centralized data store storing the first virtualized computing instance and state data corresponding to the first product manufacturing workflow, wherein the state data is updated by the first virtualized computing instance when the first product completes one or more of the production stage of the first product manufacturing workflow and the finishing stage, the QC stage, or both, of the first product manufacturing workflow.

14. The centralized workflow management system of claim 13, wherein the first orchestration manager is configured to determine whether the first product has completed the production stage of the first product manufacturing workflow by monitoring the state data.

15. The centralized workflow management system of claim 14, wherein to determine whether the first product has completed the production stage of the first product manufacturing workflow, the first orchestration manager is configured to compare a state of the production stage of the first product manufacturing workflow with an operation completion identifier, wherein the first product is determined to have completed the production stage in response to determining that the state of the production stage of the first product manufacturing workflow matches the operation completion identifier.

16. The centralized workflow management system of claim 10, wherein the first orchestration manager is configured to:

deploy a second virtualized computing instance on the first computing device responsive to the workflow manager determining that the product to be manufactured is a second product, wherein the second virtualized computing instance is associated with the second product undergoing the first product manufacturing workflow, wherein the second product is of the first product type, wherein the manufacturing line comprises a plurality of stations, and wherein each station of the plurality of stations is associated with a respective stage of the first product manufacturing workflow related to the first product type; and migrate the second virtualized computing instance from the first computing device to the second computing device, at least in part by removing the second virtualized computing instance from the first computing device, upon the second product completing the production stage of the first product manufacturing workflow.

17. The centralized workflow management system of claim 10, wherein the workflow manager is configured to run, responsive to determining that the product to be manufactured is a third product of a second product type, a second orchestration manager to execute a second product manufacturing workflow corresponding to the second product type.

18. The centralized workflow management system of claim 17, wherein the second orchestration manager is configured to:

deploy a third virtualized computing instance on a third computing device of the plurality of computing devices, associated with a production stage of the second product manufacturing workflow, wherein the third virtualized computing instance is associated with the third product undergoing the second product manufacturing workflow; and migrate the third virtualized computing instance from the third computing device to a fourth computing device, at least in part by removing the third virtualized computing instance from the third computing device, upon the third product completing the production stage of the second product manufacturing workflow.

19. A non-transitory machine-readable medium storing instructions executable by a processing resource, the instructions comprising:

instructions to deploy, by a first orchestration manager hosted in a centralized workflow management system to manage workflows for a plurality of computing devices, a virtualized computing instance on a first computing device of the plurality of computing devices associated with a production stage of a product manufacturing workflow, wherein the virtualized computing instance is associated with a product undergoing the product manufacturing workflow;

instructions to determine, by the first orchestration manager, whether the product has completed the production stage; and instructions to migrate, by the first orchestration manager upon the product completing the production stage, the virtualized computing instance from the first computing device to a second computing device of the plurality of computing devices associated with a finishing stage, a quality check (QC) stage, or both, of the product manufacturing workflow at least in part by the first orchestration manager removing the virtualized computing instance from the first computing device.

20. The non-transitory machine-readable medium of claim 19, further comprising instructions to determine that the product has completed the production stage by monitoring state data stored in a centralized data store, wherein the state data is updated by the virtualized computing instance when the product completes the production stage.

* * * * *